June 25, 1957  D. LEVIN  2,797,133
SUDS-PROPORTIONING NOZZLE
Filed Sept. 18, 1956.
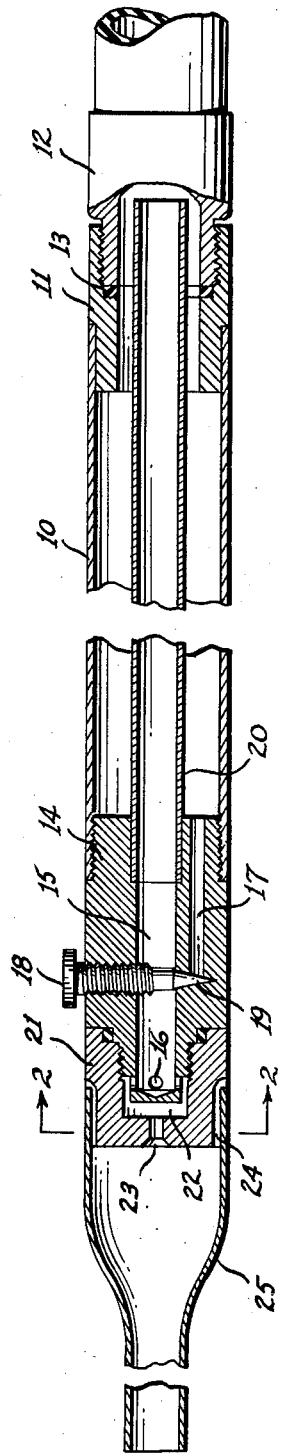
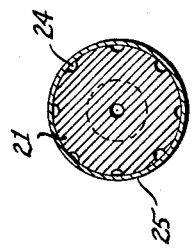
INVENTOR.
DAVID LEVIN
BY
ATTORNEY.

United States Patent Office 2,797,133
Patented June 25, 1957

2,797,133

SUDS-PROPORTIONING NOZZLE

David Levin, Philadelphia, Pa.

Application September 18, 1956, Serial No. 610,599

2 Claims. (Cl. 299—84)

This invention relates to suds-proportioning apparatus, and particularly to a suds-proportioning nozzle adapted for use on the end of a garden hose or the like for the controlled production of suds.

It is the basic objective of this invention, therefore, to provide a suds-proportioning apparatus with means for controlling the concentration of suds produced.

Another objective of the invention is to provide a suds-proportioning apparatus which is simple in construction, simple to use, and relatively inexpensive to manufacture.

These objectives, together with other objectives and advantages to be derived from the present invention, will at once become apparent from the following detailed description and accompanying drawing wherein similar numerals refer to similar parts throughout the views.

Figure 1 is a cross-sectional view of the present suds-proportioning apparatus, showing said apparatus connected to a hose which is broken away.

Figure 2 is a cross-sectional view of the orifice cap of the present apparatus taken along the line 2—2 of Fig. 1.

Referring to the drawing, 10 represents the main cylindrical chamber of the present invention, which chamber is preferably 1 inch in diameter by 9 inches in length, but may be of any other suitable dimensions. Residing in one end of said chamber 10 is a coupling 11 which is adapted to be connected to a water supply, such as to a hose fitting 12 or water faucet. It will be noted that for this purpose, the coupling 11 is bored and tapped so as to threadably engage the faucet or hose fitting 12. A washer 13 may be used to prevent leakage at this connection.

Residing within the other end of the cylindrical chamber 10 is a proportioning fitting 14, which fitting is provided with an axial bore 15 extending almost the entire length thereof, but terminating within the fitting for a purpose to be described below. The end of said fitting 14 in which the bore 15 terminates is reduced in diameter and has a plurality of small apertures 16 about its periphery which perpendicularly intersect the bore 15. A second but smaller longitudinal bore 17 is provided in the wall of the fitting 15, said longitudinal bore lying substantially in parallel relationship with the bore 15 and terminating at a point within the fitting wall for a purpose to be described below. A knurled thumbscrew 18 projects into the interior of the fitting 14 passing through the bore 15, and having a tapered end 19 which intersects the end of the longitudinal bore 17 for controlling the mixture of liquids in a manner to be considered below.

Anchored within the end of the fitting 14 remote from the apertures 16 and extending coaxially with the bore 15 is a tubular member 20 which extends throughout the length of the cylindrical chamber and slightly beyond the coupling 11. The other end of the fitting 14, that is, the end which has the apertures 16 therein, is provided with a cap 21 which is bored and tapped so as to threadably engage said fitting. It will be noted that when the cap 21 is in place on the fitting 14, a swirl chamber 22 is provided therewithin for liquid mixing purposes. The free end of the cap 21 has a divergent orifice 23 therein and its external peripheral surface is provided with a plurality of longitudinal grooves 24, as shown in Fig. 2 producing a serrated effect.

Lastly, a convergent nozzle 25 slidably fits over the cap 21 so as to partially cover the longitudinal grooves 24. It is this nozzle, which together with the cap structure and proportioning fitting produces the desired sudsing action characteristic of the present invention.

Operation

In using the present apparatus, the thumbscrew 18 is first regulated so that the tapered end 19 thereof closes the end of the bore 17. Then, with the hose fitting 12 detached from the coupling 11, a concentrated suds-promoting solution is poured into the cylindrical housing 10 so as to surround the tubular member 20. It will be noted that by means of the tubular member 20 extending slightly beyond the end of the coupling 11, this pouring is greatly facilitated, in that it is necessary that said solution does not get into the member 20. The hose fitting 12 is then attached to the coupling 11 and the apparatus is ready for use.

When the water is turned on so as to flow through the hose, it finds its way into the tubular member 20, inasmuch as the chamber 10 already contains the concentrated suds-promoting solution. If it is desired to produce a suds, the thumbscrew 18 is regulated so that its tapered end 19 partially uncovers the end of the bore 17, thus permitting some of the concentrated solution to flow therethrough into the bore 15 of fitting 14 under the influence of the water pressure on the exposed surface of the concentrated solution, mixing with water therewithin. The concentrate/water mixture then passes out through the apertures 16 into the swirl chamber 22 where, through turbulence, a high degree of mixing occurs. The mixture then passes out through the divergent orifice 23 where, because of the sudden reduction in diameter, it emerges as a high velocity conical stream. As this happens, the pressure within the nozzle 25 is reduced so that external air is drawn thereinto by means of the longitudinal grooves 24 about the surface of the cap 21. The air thus drawn in promotes aeration of the stream emerging from the orifice 23 so that suds are immediately produced as the liquid mixture emanates from the end of the nozzle 25.

It will be noted that the concentration of the suds may be regulated or controlled at will, merely by the use of the thumbscrew 18, a greater concentration being achieved when said thumbscrew uncovers the bore 17.

Although the present discussion of this invention has been limited to the above-described preferred embodiment, variations thereof are possible without departing from the spirit of the invention. For example, instead of having the cap 21 serrated, the nozzle 25 may be provided with apertures for the induction of air for aeration purposes. Or, instead of controlling the flow of the concentrate by means of the thumbscrew 18, a small tubular connection may be provided between the chamber 10 and tubular member 20, said connection being provided with a valve for control purposes. It is to be understood, therefore, that the invention is not to be limited to the particular embodiment disclosed, but rather only to the inventive concept as defined by the appended claims.

What is claimed is:

1. A suds-proportioning apparatus comprising, a cylindrical casing, a tubular member within said casing in concentric relationship therewith, a mixing fitting on one end of said casing and having a bore which receives one end of said tubular member and which terminates within the fitting, the end of said fitting remote from said tubular member having a plurality of apertures about its periphery which communicate with said fitting bore, said fitting having a second bore which causes the communication of said first bore with the space between said tubular member and cylindrical casing, metering means carried by said fitting and regulating the flow through said second bore, an orifice cap on said mixing fitting having a plurality of grooves in its surface, said cap having a divergent orifice therein, and a convergent nozzle on said orifice cap and partially covering said grooves.

2. A suds-proportioning apparatus comprising, a cylindrical casing, a tubular member within said casing in concentric relationship therewith, providing an annular space therebetween, a mixing fitting on one end of said casing and having a bore which receives one end of said tubular member and which terminates within the fitting, the end of said fitting remote from said tubular member having a plurality of apertures about its periphery which communicate with said fitting bore, said fitting having a second bore which causes the communication of said first bore with said annular space, a thumbscrew residing within said fitting and having a tapered end projecting into said second bore, an orifice cap on said mixing fitting having a plurality of longitudinal grooves in its surface, the joinder of said orifice cap to said fitting providing a mixing chamber therebetween, said orifice cap having a divergent orifice therein, and a convergent nozzle on said orifice cap and partially covering said longitudinal grooves.

References Cited in the file of this patent
UNITED STATES PATENTS

| | | |
|---|---|---|
| 646,491 | Dunlap | Apr. 3, 1900 |
| 2,690,717 | Goodrie | Oct. 5, 1954 |
| 2,768,030 | Rowlett | Oct. 23, 1956 |